(12) United States Patent
Bunno et al.

(10) Patent No.: US 10,480,575 B2
(45) Date of Patent: Nov. 19, 2019

(54) BEARING STRUCTURE AND TURBOCHARGER

(71) Applicant: IHI Corporation, Koto-ku (JP)

(72) Inventors: Kenji Bunno, Tokyo (JP); Yutaka Uneura, Tokyo (JP); Shinichi Kaneda, Tokyo (JP); Yuichi Daito, Tokyo (JP); Hideyuki Kojima, Tokyo (JP); Tomomi Sugiura, Tokyo (JP); Shunsuke Nishii, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/885,931

(22) Filed: Feb. 1, 2018

(65) Prior Publication Data

US 2018/0156269 A1 Jun. 7, 2018

Related U.S. Application Data

(63) Continuation of application No. PCT/JP2016/071841, filed on Jul. 26, 2016.

(30) Foreign Application Priority Data

Aug. 11, 2015 (JP) .................................. 2015-158840

(51) Int. Cl.
*F01D 25/18* (2006.01)
*F16C 17/10* (2006.01)
(Continued)

(52) U.S. Cl.
CPC ........ *F16C 33/1025* (2013.01); *F01D 25/162* (2013.01); *F01D 25/166* (2013.01);
(Continued)

(58) Field of Classification Search
CPC .......... F16C 17/02; F16C 17/10; F16C 33/10; F16C 33/1025; F16C 33/6681;
(Continued)

(56) References Cited

U.S. PATENT DOCUMENTS

| 2014/0127051 A1* | 5/2014 | Takahashi | F01D 25/166 417/406 |
| 2014/0186159 A1* | 7/2014 | Yeom | F16C 33/1025 415/112 |
| 2014/0219777 A1* | 8/2014 | Uneura | F01D 25/186 415/112 |

FOREIGN PATENT DOCUMENTS

| JP | 06-317171 | 11/1994 |
| JP | 08-284675 | 10/1996 |

(Continued)

OTHER PUBLICATIONS

English translation of the International Preliminary Report on Patentability and Written Opinion dated Feb. 22, 2018 in PCT/JP2016/071841, 8 pages.

(Continued)

*Primary Examiner* — Alan B Waits

(74) *Attorney, Agent, or Firm* — Oblon, McClelland, Maier & Neustadt, L.L.P.

(57) ABSTRACT

A bearing structure includes: a housing; a bearing hole formed in the housing and provided with a bearing for pivotally supporting a shaft; a clearance groove provided in the bearing hole, having an opposing wall portion radially opposed to the shaft, and communicating with an oil drainage passage provided below a shaft center of the shaft; and at least one of a narrow portion or a wide portion in the opposing wall portion of the clearance groove with a boundary right above the shaft center of the shaft, the narrow portion provided in a rear side in a rotation direction of the shaft, the narrow portion having a narrower gap from the shaft than that in a front side in the rotation direction of the shaft, the wide portion provided in the front side in the rotation direction of the shaft, the wide portion having a wider gap from the shaft than that in the rear side in the rotation direction of the shaft.

2 Claims, 2 Drawing Sheets

(51) Int. Cl.
  *F16C 33/10* (2006.01)
  *F01D 25/16* (2006.01)
  *F02B 39/14* (2006.01)
  *F16C 27/02* (2006.01)

(52) U.S. Cl.
  CPC .............. *F01D 25/18* (2013.01); *F16C 17/10* (2013.01); *F16C 33/1045* (2013.01); *F02B 39/14* (2013.01); *F05D 2220/40* (2013.01); *F16C 27/02* (2013.01); *F16C 2360/24* (2013.01)

(58) Field of Classification Search
  CPC .. F16C 27/02; F16C 2360/24; F16C 33/1045; F01D 25/162; F01D 25/166; F01D 25/18; F02B 39/00; F02B 39/14; F05D 2220/40; F05D 2240/60
  See application file for complete search history.

(56) References Cited

FOREIGN PATENT DOCUMENTS

| | | |
|---|---|---|
| JP | 2001-289052 | 10/2001 |
| JP | 2004-132319 | 4/2004 |
| JP | 2005-214094 | 8/2005 |
| JP | 2010-270673 | 12/2010 |
| JP | 2014-015854 | 1/2014 |
| JP | 2014-025396 | 2/2014 |
| JP | 2014-043804 | 3/2014 |
| JP | 2014-152634 A | 8/2014 |
| JP | 2014-238009 A | 12/2014 |

OTHER PUBLICATIONS

International Search Report dated Oct. 4, 2016 in PCT/JP2016/071841 filed Jul. 26, 2016 (with English Translation).

Japanese Office Action dated Aug. 26, 2018 Japanese Patent Appilcation No. 2017-534169 (with unedited computer generated English translation), 7 pages.

Combined Office Action and Search Report dated Dec. 10, 2018 in Chinese Patent Application No. 201680045627.6 (with English and Japanese language translations).

Office Action issued in Japanese Patent Publication No. 2017-534169 dated Feb. 26, 2019, (w/ English Translation).

\* cited by examiner

BEARING STRUCTURE AND TURBOCHARGER

CROSS REFERENCE TO RELATED APPLICATIONS

This application is a continuation application of International Application No. PCT/JP2016/071841, filed on Jul. 26, 2016, which claims priority to Japanese Patent Application No. 2015-158840, filed on Aug. 11, 2015, the entire contents of which are incorporated by reference herein.

BACKGROUND ART

Technical Field

The present disclosure relates to a bearing structure pivotally supporting a shaft, and a turbocharger.

Related Art

In the related art, turbochargers in which a shaft is pivotally supported by a bearing housing in a freely rotatable manner are known. In a turbocharger, a turbine impeller is provided at one end of the shaft, and a compressor impeller is provided at another end of the shaft. The turbocharger is connected to an engine, and the turbine impeller is rotated by exhaust gas discharged from the engine. The rotation of the turbine impeller causes the compressor impeller to rotate via the shaft. The turbocharger compresses the air in accordance with the rotation of the compressor impeller and delivers the air to the engine.

In a turbocharger described in Patent Literature 1, an annular semi-floating bearing is accommodated in a bearing hole formed in a housing. Lubricating oil having lubricated the semi-floating bearing flows out into a scattering space formed between the bearing hole and an impeller. The lubricating oil flowed out into the scattering space flows down through an oil drainage passage formed vertically below the bearing hole and is discharged to the outside of the housing. Furthermore, in the configuration described in Patent Literature 1, an annular clearance groove is formed in the bearing hole. The clearance groove is positioned between the semi-floating bearing and the scattering space. A part of the lubricating oil flowing from the bearing hole toward the scattering space flows into the clearance groove. A cutout portion for communicating the bearing hole and the oil drainage passage is formed on a wall portion vertically below the shaft on which the clearance groove is formed. The lubricating oil flowed into the clearance groove is discharged to the oil drainage passage through the cutout portion.

CITATION LIST

Patent Literature

Patent Literature 1: Japanese Patent Application Laid-Open No. 2005-214094

SUMMARY

Technical Problem

As described above in Patent Literature 1, in this bearing structure, the clearance groove is formed in the bearing hole, thereby allowing a part of the lubricating oil to flow into the clearance groove. That is, a part of the lubricating oil flowed into the clearance groove is discharged directly to the oil drainage passage without passing through the scattering space. This suppresses leakage of lubricating oil to the impeller side. However, in an apparatus such as a turbocharger, it is demanded to increase the number of revolutions. As the number of revolutions increases, the amount of lubricating oil supplied to the bearing increases. Therefore, further improvement of the oil draining property is desired.

An object of the present disclosure is to provide a bearing structure and a turbocharger capable of improving the oil draining property.

Solution to Problem

In order to solve the above problem, a bearing structure according to one embodiment of the present disclosure includes: a housing; a bearing hole formed in the housing and provided with a bearing for pivotally supporting a shaft; a clearance groove formed on an inner circumferential surface of the bearing hole, having an opposing wall portion radially opposed to the shaft, and communicating with an oil drainage passage provided below a shaft center of the shaft; and at least one of a narrow portion or a wide portion in the opposing wall portion of the clearance groove with a boundary right above the shaft center of the shaft, the narrow portion provided in a rear side in a rotation direction of the shaft, the narrow portion having a narrower gap from the shaft than that in a front side in the rotation direction of the shaft, the wide portion provided in the front side in the rotation direction of the shaft, the wide portion having a wider gap from the shaft than that in the rear side in the rotation direction of the shaft.

The bearing structure may further include a scattering space formed in the housing, positioned between an impeller provided at one end of the shaft and the clearance groove, and communicating with the oil drainage passage.

The bearing structure may further include a communicating opening formed in the housing, communicating the clearance groove with the oil drainage passage, and being provided with the narrow portion in a continuous manner in the front side in the rotation direction of the shaft.

The bearing structure may further include a communicating opening formed in the housing and communicating the clearance groove with the oil drainage passage, in which the wide portion may have a wider gap from the shaft toward the communicating opening.

In order to solve the above problem, a turbocharger according to an embodiment of the present disclosure includes the bearing structure described above.

Effects of Disclosure

According to the present disclosure, the oil draining property can be improved.

DESCRIPTION OF EMBODIMENT

A Embodiment of the present disclosure will be described in detail below with reference to the accompanying drawings. The dimensions, materials, other specific numerical values, and the like illustrated in such embodiment are merely examples for facilitating understanding, and the present disclosure is not limited thereby except for a case where it is specifically mentioned. Note that, in the present specification and the drawings, elements having substantially the same function and structure are denoted by the same symbol, and redundant explanations are omitted. Components not directly related to the present disclosure are not illustrated.

Figure 1:
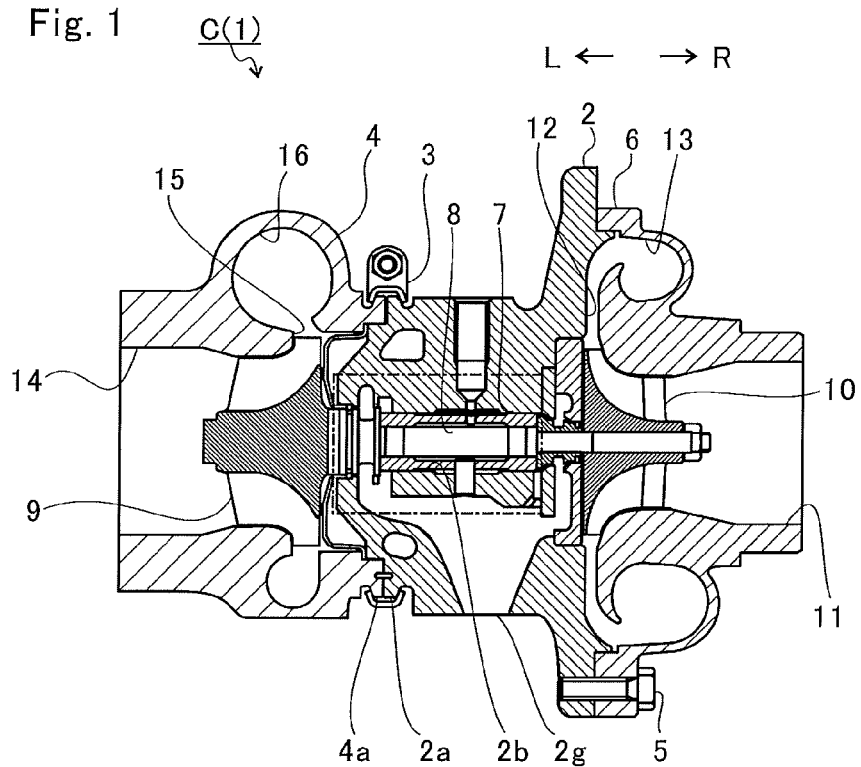
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is a left side of the turbocharger C and that a direction of an arrow R is a right side of the turbocharger C. As illustrated in FIG. 1, the turbocharger C includes a turbocharger main body 1. The turbocharger main body 1 includes a bearing housing 2 (housing). A turbine housing 4 is connected to the left side of the bearing housing 2 by a fastening mechanism 3. A compressor housing 6 is connected to the right side of the bearing housing 2 by a fastening bolt 5. The bearing housing 2, the turbine housing 4, and the compressor housing 6 are integrated.

A protrusion 2a is provided on an outer circumferential surface of the bearing housing 2 in the vicinity of the turbine housing 4. The protrusion 2a protrudes in a radial direction of the bearing housing 2. A protrusion 4a is provided on an outer circumferential surface of the turbine housing 4 in the vicinity of the bearing housing 2. The protrusion 4a protrudes in a radial direction of the turbine housing 4. The bearing housing 2 and the turbine housing 4 are fixed to each other by fastening the protrusions 2a and 4a by the fastening mechanism 3. The fastening mechanism 3 is formed by, for example, a G coupling which clamps the protrusions 2a and 4a.

In the bearing housing 2, a bearing hole 2b penetrating the turbocharger C in the left-and-right direction is formed. In the bearing hole 2b, a semi-floating bearing 7 (bearing) is provided. A shaft 8 is pivotally supported by the semi-floating bearing 7 in a freely rotatable manner. A turbine impeller 9 (impeller) is integrally fixed to a left end portion of the shaft 8. The turbine impeller 9 is accommodated in the turbine housing 4 in a freely rotatable manner. A compressor impeller 10 (impeller) is integrally fixed to a right end portion of the shaft 8. The compressor impeller 10 is accommodated in the compressor housing 6 in a freely rotatable manner.

In the compressor housing 6, an intake port 11 opening toward the right side of the turbocharger C is formed. The intake port 11 is connected to an air cleaner (not illustrated). In a state where the bearing housing 2 and the compressor housing 6 are connected by the fastening bolt 5, opposing surfaces of the bearing housing 2 and the compressor housing 6 form a diffuser flow passage 12 for pressurizing the air. The diffuser flow passage 12 is annularly formed outward from an inner side in the radial direction of the shaft 8. The diffuser flow passage 12 communicates with the intake port 11 via the compressor impeller 10 on the inner side in the radial direction.

Furthermore, the compressor housing 6 is provided with a compressor scroll flow passage 13. The compressor scroll flow passage 13 is positioned on an outer side in the radial direction of the shaft 8 with respect to the diffuser flow passage 12. The compressor scroll flow passage 13 communicates with an intake port of an engine (not illustrated). Furthermore, the compressor scroll flow passage 13 communicates also with the diffuser flow passage 12. When the compressor impeller 10 rotates, therefore, the air is sucked into the compressor housing 6 from the intake port 11. The sucked air is accelerated by the action of the centrifugal force in the process of flowing through blades of the compressor impeller 10. This air is pressurized by the diffuser flow passage 12 and the compressor scroll flow passage 13 and guided to the intake port of the engine.

In the turbine housing 4, a discharge port 14 opening toward the left side of the turbocharger C is formed. The discharge port 14 is connected to an exhaust gas purification device (not illustrated). In the turbine housing 4, a flow passage 15, an annular turbine scroll flow passage 16 positioned on the outer side in the radial direction of the turbine impeller 9 with respect to the flow passage 15 are provided. The turbine scroll flow passage 16 communicates with a gas inlet port (not illustrated). Exhaust gas discharged from an exhaust manifold of the engine (not illustrated) is guided to the gas inlet port. The turbine scroll flow passage 16 communicates also with the flow passage 15. Therefore, the exhaust gas guided from the gas inlet port to the turbine scroll flow passage 16 is guided to the discharge port 14 via the flow passage 15 and the turbine impeller 9. The exhaust gas rotates the turbine impeller 9 in the process of flowing therethrough.

The turning force of the turbine impeller 9 is then transmitted to the compressor impeller 10 via the shaft 8. The turning force of the compressor impeller 10 allows the air to be pressurized and guided to the intake port of the engine as described above.

Figure 2:
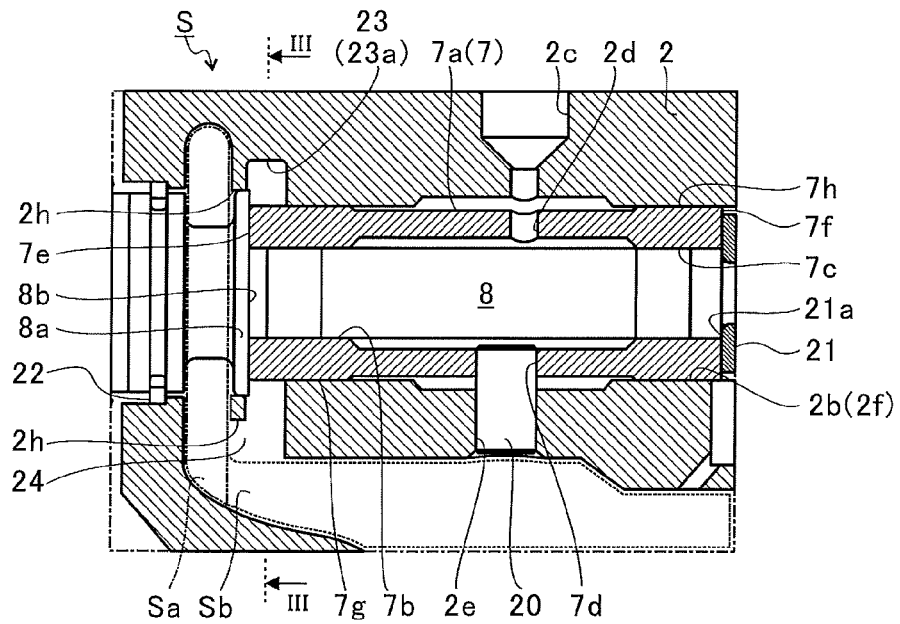
FIG. 2 is a view extracted from a one-dot chain line portion of FIG. 1.

FIG. 2 is a view extracted from a one-dot chain line portion of FIG. 1. As illustrated in FIG. 2, a bearing structure S is provided inside the bearing housing 2. In the bearing structure S, lubricating oil flowed into the bearing hole 2b from an oil passage 2c formed in the bearing housing 2 is supplied to the semi-floating bearing 7.

The semi-floating bearing 7 has an annular main body portion 7a. The shaft 8 is inserted inside the main body portion 7a. On an inner circumferential surface of the main body portion 7a, two bearing surfaces 7b and 7c are formed while separated in the axial direction of the shaft 8 (hereinafter simply referred to as the axial direction).

The semi-floating bearing 7 includes an oil hole 2d penetrating the main body portion 7a from the inner circumferential surface to the outer circumferential surface thereof. A part of lubricating oil supplied to the bearing hole 2b passes through the oil hole 2d and flows into the inner circumferential surface of the main body portion 7a. The lubricating oil flowed into the inner circumferential surface of the main body portion 7a is supplied to a gap between the shaft 8 and each of the bearing surfaces 7b and 7c. The shaft 8 is pivotally supported by the oil film pressure of the lubricating oil supplied to the gap between the shaft 8 and each of the bearing surfaces 7b and 7c.

The main body portion 7a is further provided with a through hole 7d penetrating from the inner circumferential surface to the outer circumferential surface thereof. In the bearing housing 2, a pin hole 2e is formed at a portion opposed to the through hole 7d. The pin hole 2e penetrates a wall portion forming the bearing hole 2b. In the pin hole 2e, a positioning pin 20 is for example press-fitted from a lower side in FIG. 2 and thereby held. A tip of the positioning pin 20 is inserted into the through hole 7d of the semi-floating bearing 7. The positioning pin 20 regulates rotation and movement in the axial direction of the semi-floating bearing 7.

Furthermore, on the shaft 8, an oil thrower member 21 is fixed to the right side (the compressor impeller 10 side) in FIG. 2 with respect to the main body portion 7a. The oil thrower member 21 is an annular member. The oil thrower member 21 scatters the lubricating oil flowing to the compressor impeller 10 side along the shaft 8 to the outer side in the radial direction. That is, leakage of lubricating oil to the compressor impeller 10 side is suppressed by the oil thrower member 21.

The oil thrower member 21 is axially opposed to the main body portion 7a. An outer diameter of an opposing surface 21a, opposing to the main body portion 7a, of the oil thrower member 21 is larger than an inner diameter of the bearing surface 7c and smaller than an outer diameter of the main body portion 7a.

The shaft 8 is provided with a large diameter portion 8a having an outer diameter larger than the inner diameter of the bearing surface 7b of the main body portion 7a. The outer diameter of the large diameter portion 8a is larger than the outer diameter of the main body portion 7a. The large diameter portion 8a is positioned on the left side (the turbine impeller 9 side) with respect to the main body portion 7a in FIG. 2 and is opposed to the main body portion 7a in the axial direction.

In this manner, the main body portion 7a is interposed between the oil thrower member 21 and the large diameter portion 8a in the axial direction. Moreover, movement of the main body portion 7a in the axial direction is restricted by the positioning pin 20. Lubricating oil is supplied to a gap between the main body portion 7a and the oil thrower member 21 and to a gap between the main body portion 7a and the large diameter portion 8a. When the shaft 8 moves in the axial direction, the oil thrower member 21 or the large diameter portion 8a is supported by the oil film pressure between the oil thrower member 21 or the large diameter portion 8a and the main body portion 7a. That is, the semi-floating bearing 7 includes bearing surfaces 7e and 7f which receive thrust loads on both axial end surfaces of the main body portion 7a.

Damper portions 7g and 7h are formed on both axial end sides of the outer circumferential surface of the main body portion 7a. The damper portions 7g and 7h suppress vibration of the shaft 8 by the oil film pressure of the lubricating oil supplied to a gap between the damper portions 7g and 7h and an inner circumferential surface 2f of the bearing hole 2b.

As described above, a part of the lubricating oil supplied to the bearing surfaces 7b and 7e and the damper portion 7g flows out from the bearing hole 2b to the turbine impeller 9 side. A scattering space Sa is formed inside the bearing housing 2. The scattering space Sa is formed between the turbine impeller 9 and the bearing hole 2b. The scattering space Sa is continuous with the bearing hole 2b in the axial direction of the shaft 8. Furthermore, the scattering space Sa extends toward a radially outer side with respect to the bearing hole 2b in the rotation direction of the shaft 8 (hereinafter simply referred to as the rotation direction). The lubricating oil flowed out from the bearing hole 2b to the turbine impeller 9 side is scattered radially outward in the scattering space Sa by the centrifugal force of the shaft 8.

The scattering space Sa is continuous with an oil drainage passage Sb vertically below (the lower side in FIG. 2) the bearing hole 2b. The oil drainage passage Sb is provided below the shaft center of the shaft 8. More specifically, the oil drainage passage Sb extends vertically below the bearing hole 2b inside the bearing housing 2. The oil drainage passage Sb communicates with an oil discharge port 2g formed on the lower side (vertically lower side) of the bearing housing 2 illustrated in FIG. 1.

The lubricating oil scattered vertically above the shaft 8 in the scattering space Sa flows down vertically downward from the shaft 8 along the inner wall of the bearing housing 2 forming the scattering space Sa. The lubricating oil flowing down along the inner wall of the bearing housing 2 merges with lubricating oil scattered vertically downward with respect to the shaft 8 in the scattering space Sa and is led to the oil drainage passage Sb. The lubricating oil guided to the oil drainage passage Sb flows down the oil drainage passage Sb toward the oil discharge port 2g and is discharged to the outside of the bearing housing 2.

A sealing ring 22 is arranged between the scattering space Sa and the turbine impeller 9. The sealing ring 22 is positioned in a gap in the radial direction between the shaft 8 and the bearing housing 2. The sealing ring 22 suppresses leakage of the lubricating oil from the scattering space Sa side to the turbine impeller 9 side.

In this manner, leakage of the lubricating oil to the turbine impeller 9 side is suppressed by the sealing ring 22. However, if the amount of lubricating oil flowing out from the bearing hole 2b to the scattering space Sa is too large, sealing property of the sealing ring 22 is deteriorated. Therefore, a clearance groove 23 is formed in the bearing housing 2. The clearance groove 23 is provided on the inner circumferential surface 2f of the bearing hole 2b.

An annular protrusion 2h is formed in the bearing housing 2 radially outward from the large diameter portion 8a. The annular protrusion 2h annularly surrounds the large diameter portion 8a. In addition, the annular protrusion 2h protrudes toward a radially inner side with respect to the bottom surface of the clearance groove 23. The clearance groove 23 is positioned on the opposite side to the scattering space Sa (on the side of the center of the bearing hole 2b, on the side of the compressor impeller 10) with the annular protrusion 2h interposed therebetween. That is, the clearance groove 23 is separated from the scattering space Sa in the axial direction of the shaft 8 with a wall surface (annular protrusion 2h) interposed therebetween. In other words, the scattering space Sa is positioned between the turbine impeller 9 and the clearance groove 23. A part of the lubricating oil having supplied to the bearing surfaces 7b and 7e and the damper portion 7g flows into the clearance groove 23.

Here, an opposing surface 8b of the large diameter portion 8a opposing to the main body portion 7a is positioned in a radially inner side of the clearance groove 23. Therefore, lubricating oil having lubricated the bearing surfaces 7b and 7e easily flows into the clearance groove 23 along the opposing surface 8b. The clearance groove 23 is positioned in a radially outer side of the main body portion 7a. Therefore, the lubricating oil having passed through the gap between the damper portion 7g and the bearing hole 2b easily flows into the clearance groove 23.

The outer diameter of the large diameter portion 8a is larger than the outer diameter of the main body portion 7a. Therefore, lubricating oil flowed in the axial direction from the damper portion 7g along the outer circumferential surface of the main body portion 7a is changed of a flow direction thereof by the large diameter portion 8a into the radial direction and thus easily flows into the clearance groove 23.

Furthermore, a communicating opening 24 is provided in the bearing housing 2. The communicating opening 24 penetrates through a partition wall that partitions, in the radial direction of the shaft 8, the bearing hole 2b and the oil drainage passage Sb in the bearing housing 2. That is, the communicating opening 24 communicates the clearance groove 23 (the bearing hole 2b) and the oil drainage passage Sb. Therefore, lubricating oil flowed into the clearance groove 23 is guided to the oil drainage passage Sb via the communicating opening 24.

Figure 3:
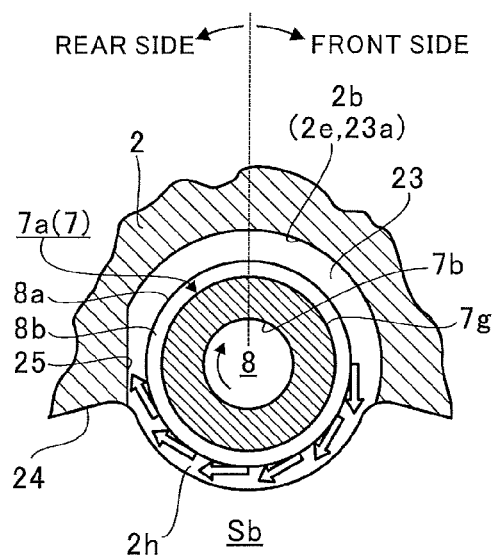
FIG. 3 is a cross-sectional view taken along line III-III of FIG. 2.

FIG. 3 is a cross-sectional view taken along line III-III of FIG. 2. In FIG. 3, in order to facilitate understanding, a part of the bearing housing 2 is omitted by illustrating by a wave line. Also, illustration of portions on the radially outer side of the shaft 8 with respect to the oil drainage passage Sb is omitted.

A part of lubricating oil turns as the large diameter portion 8a rotates and is scattered above the shaft 8 in the clearance groove 23 by the centrifugal force. The lubricating oil scattered in an upper side with respect to the shaft 8 flows down the shaft 8 along an inner wall of the clearance groove 23. The lubricating oil flowing along the inner wall of the clearance groove 23 merges with lubricating oil scattered below the shaft 8 in the clearance groove 23 and is ejected from the communicating opening 24 to the oil drainage passage Sb.

Here, as illustrated in FIGS. 2 and 3, the annular protrusion 2h extends also below the shaft 8. Therefore, scattering of lubricating oil from the communicating opening 24 to the scattering space Sa side is suppressed, and the lubricating oil is easily led to the oil drainage passage Sb.

In this manner, a part of the lubricating oil is ejected directly from the bearing hole 2b to the oil drainage passage Sb without passing through the scattering space Sa. Therefore, the amount of lubricating oil flowing to the turbine impeller 9 side with respect to the large diameter portion 8a is suppressed. Therefore, leakage of the lubricating oil from the sealing ring 22 to the turbine impeller 9 side is suppressed.

The clearance groove 23 has an opposing wall portion 23a opposed to the shaft 8 in the radial direction. The opposing wall portion 23a is opposed to the shaft 8 with a predetermined gap therebetween in the radial direction. As illustrated in FIG. 3, a narrow portion 25 is formed in the opposing wall portion 23a. The narrow portion 25 is provided on the rear side in the rotation direction of the shaft 8 with a boundary (divided at) right above (a broken line intersecting with the shaft center of the shaft 8 and extending in the up-and-down direction in FIG. 3) the shaft center of the shaft 8. The narrow portion 25 is formed continuously from the boundary with the communicating opening 24 to the front side in the rotation direction. In other words, the narrow portion 25 is continued to the front side in the rotation direction of the shaft 8 with respect to the communicating opening 24. The narrow portion 25 extends parallel to the vertical direction. A gap between a wall surface of the narrow portion 25 and the shaft 8 is narrower than a gap between the opposing wall portion 23a on the front side in the rotation direction of the shaft 8 and the shaft 8 with the boundary (divided at) right above the shaft center of the shaft 8. In other words, the gap between the wall surface of the narrow portion 25 and the shaft 8 is narrower than the smallest gap between the opposing wall portion 23a on the front side in the rotation direction of the shaft 8 and the shaft 8 with the boundary (divided at) right above the shaft center of the shaft 8. In the narrow portion 25, the gap between the narrow portion 25 and the shaft 8 is the smallest at a portion equal in height to the shaft center of the shaft 8. Here, the narrow portion 25 forms a wall surface protruding inward in the radial direction with respect to a virtual wall surface assuming that the opposing wall portion 23a extends to the same coordinate phase in the circumferential direction. For example, as illustrated in FIG. 3, the narrow portion 25 may have a shape protruding inward in a substantially arc shape.

Lubricating oil that turning as the large diameter portion 8a rotates is thrown upward from the communicating opening 24 side to above the shaft 8. Lubricating oil that has flowed into the clearance groove 23 turns in accordance with the rotation of the shaft 8 and is prompted to circulate in the narrow portion 25 in the rotation direction. However, in a case where the narrow portion 25 having a narrow gap in the radial direction from the shaft 8 is provided, the amount of lubricating oil thrown upward is suppressed. This allows lubricating oil to be easily discharged from the clearance groove 23 to the oil drainage passage Sb, and the oil draining property can be thus improved.

Figure 4:
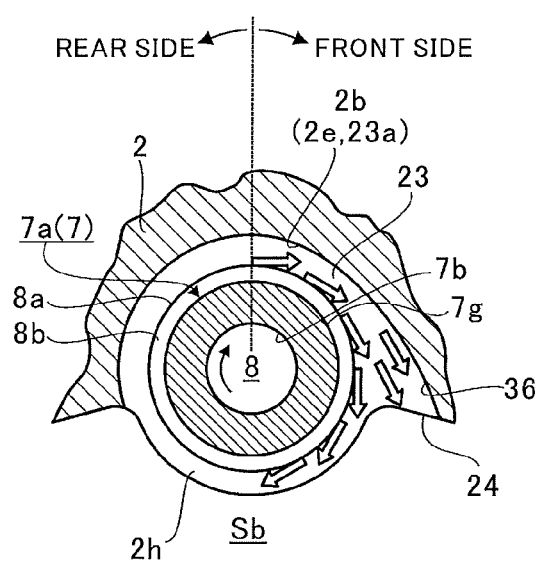
FIG. 4 is an explanatory diagram for explaining a modification.

FIG. 4 is an explanatory diagram for explaining a modification. FIG. 4 is a diagram illustrating a cross-sectional view of the modification at the same position as that in FIG. 3. As illustrated in FIG. 4, in the modification, a wide portion 36 is provided on the opposing wall portion 23a of the clearance groove 23. The wide portion 36 is formed in the opposing wall portion 23a on the front side in the rotation direction with the boundary (divided at) right above the shaft center of the shaft 8. Specifically, the wide portion 36 is formed continuously from the communicating opening 24 toward the rear side in the rotation direction. The wide portion 36 has a wider gap from the shaft 8 than that of the opposing wall portion 23a in the rear side in the rotation direction with the boundary (divided at) right above the shaft center of the shaft 8.

When lubricating oil turned as the large diameter portion 8a rotates flows downward along the rotation direction of the shaft 8, the lubricating oil spreads radially outward due to centrifugal force and flows down. Since the wide portion 36 is formed, the flow of the lubricating oil spreading outward in the radial direction and flowing down is less likely to be inhibited. Therefore, lubricating oil can be efficiently discharged from the clearance groove 23 to the oil drainage passage Sb.

Furthermore, the wide portion 36 has a wider gap from the shaft 8 toward the communicating opening 24 (toward the front in the rotation direction) on the front side in the rotation direction. That is, the wall surface of the wide portion 36 has a wider gap from the shaft 8 toward the communicating opening 24. Here, the wall surface of the wide portion 36 forms a wall surface protruding outward in the radial direction with respect to a virtual wall surface assuming that the opposing wall portion 23a extends to the same coordinate phase in the circumferential direction. For example, the wide portion 36 has a curved shape in a cross section perpendicular to the axial direction of the shaft 8 illustrated in FIG. 4. Moreover, the curvature radius of the curve increases as the curve approaches the communicating opening 24.

That is, the wide portion 36 extends along the flow of lubricating oil spreading radially outward due to the centrifugal force and flowing down. Therefore, the wide portion 36 allows the flow of lubricating oil to be unlikely to be inhibited, and thus the oil draining property can be further improved.

In the aforementioned embodiment, the case where the narrow portion 25 is formed has been described. However, the wide portion 36 described in the modification may be applied to the configuration of the embodiment. That is, both of the narrow portion 25 and the wide portion 36 may be formed in the opposing wall portion 23a of the clearance groove 23. In this case, discharge of lubricating oil from the clearance groove 23 to the oil drainage passage Sb is promoted by both of the narrow portion 25 and the wide portion 36, and thus the oil draining property is synergistically improved.

Furthermore, in the aforementioned embodiment, the case where the communicating opening 24, the clearance groove 23, and the narrow portion 25 are provided on the turbine impeller 9 side of the bearing hole 2b has been described. However, the communicating opening 24, the clearance groove 23, and the narrow portion 25 may be provided on the compressor impeller 10 side of the bearing hole 2b. Similarly, in the aforementioned modification, the case where the communicating opening 24, the clearance groove 23, and the wide portion 36 are provided on the turbine impeller 9 side of the bearing hole 2b has been described. However, the communicating opening 24, the clearance groove 23, and the wide portion 36 may be provided on the compressor impeller 10 side of the bearing hole 2b.

Furthermore, in the aforementioned embodiment, the case where the narrow portion 25 is formed continuously from the boundary with the communicating opening 24 to the front side in the rotation direction has been described. However, the narrow portion 25 may be formed separated from the boundary with the communicating opening 24. In other words, the rear side end portion of the narrow portion 25 may be separated from the communicating opening 24. However, when the narrow portion 25 is formed continuously from the boundary with the communicating opening 24 to the front side in the rotation direction, lubricating oil flowing from the communicating opening 24 side to the narrow portion 25 side is effectively reduced, thereby enabling further improving the oil draining property.

Furthermore, in the aforementioned modification, the case where the wide portion 36 is formed continuously from the boundary with the communicating opening 24 to the rear side in the rotation direction has been described. However, the wide portion 36 may be formed separated from the boundary with the communicating opening 24. In other words, the front side end portion of the wide portion 36 may be separated from the communicating opening 24. Also in this case, the wide portion 36 suppresses occurrence of a vortex flow or the like. As a result, it becomes unlikely that a state in which the actual flow passage area of the communicating opening 24 is reduced due to an influence of a vortex flow or the like, and the oil draining property can be thus improved. However, in a case where the wide portion 36 is continuously formed from the communicating opening 24 to the rear side in the rotation direction, lubricating oil can be efficiently discharged from the clearance groove 23 to the communicating opening 24.

Furthermore, in the aforementioned modification, the case where the wide portion 36 has the wider gap from the shaft 8 toward the communicating opening 24 in the front side in the rotation direction has been described. However, the gap between the shaft 8 and the wide portion 36 does not have to be wider toward the communicating opening 24 in the front side in the rotation direction. For example, the gap between the wide portion 36 and the shaft 8 may be constant.

Furthermore, in the aforementioned embodiment and the modification, the scattering space Sa positioned between the turbine impeller 9 and the clearance groove 23 and communicating with the oil drainage passage Sb is included. However, the scattering space Sa is not indispensable.

In the embodiment and the modification described above, the narrow portion 25 and the wide portion 36 are separately provided. However, both of the narrow portion 25 and the wide portion 36 may be provided. That is, the bearing structure includes at least one of the narrow portion 25 or the wide portion 36.

Although the embodiment has been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope.

What is claimed is:

1. A bearing structure, comprising:
   a housing;
   a bearing hole formed in the housing and provided with a bearing for pivotally supporting a shaft;
   a clearance groove formed on an inner circumferential surface of the bearing hole, having an opposing wall portion radially opposed to the shaft;
   an oil drainage passage provided below a shaft center of the shaft;
   a communicating opening formed in the housing, communicating the clearance groove with the oil drainage passage;
   a scattering space formed in the housing, positioned between an impeller provided at one end of the shaft and the clearance groove, and communicating with the oil drainage passage;
   an annular protrusion formed in the housing, positioned between the clearance groove and the scattering space, and annularly surrounding the large diameter portion of the shaft; and
   a wide portion in the opposing wall portion of the clearance groove with a theoretical boundary right above the shaft center of the shaft, provided in a front side in a rotation direction of the shaft, having a wider gap from the shaft than that in a rear side in the rotation direction of the shaft, wherein a curvature radius of the wider gap increases in the rotational direction toward the communicating opening.

2. A turbocharger comprising the bearing structure according to claim 1.

* * * * *